(12) United States Patent
Su et al.

(10) Patent No.: US 12,541,822 B2
(45) Date of Patent: Feb. 3, 2026

(54) METHOD AND APPARATUS OF PROCESSING IMAGE, COMPUTING DEVICE, AND MEDIUM

(71) Applicant: SINO CANADA HEALTH ENGINEERING RESEARCH INSTITUTE (Hefei) Ltd., Anhui (CN)

(72) Inventors: Jin Su, Anhui (CN); Di Zhou, Anhui (CN); Huabin Wang, Anhui (CN); Xianju Diao, Anhui (CN); Xuejun Li, Anhui (CN); Zhiyang Wang, Anhui (CN); Gong Zhang, Anhui (CN); Yujie Xu, Anhui (CN); Xiumei Yin, Anhui (CN)

(73) Assignee: Sino Canada Health Engineering Research Institute (Hefei) Ltd., Hefei (CN)

( * ) Notice: Subject to any disclaimer, the term of this patent is extended or adjusted under 35 U.S.C. 154(b) by 488 days.

(21) Appl. No.: 18/004,141

(22) PCT Filed: Jul. 7, 2020

(86) PCT No.: PCT/CN2020/100634
§ 371 (c)(1),
(2) Date: Jan. 3, 2023

(87) PCT Pub. No.: WO2022/006738
PCT Pub. Date: Jan. 13, 2022

(65) Prior Publication Data
US 2023/0260095 A1 Aug. 17, 2023

(51) Int. Cl.
*G06T 5/50* (2006.01)
*G06T 5/20* (2006.01)
(Continued)

(52) U.S. Cl.
CPC .......... *G06T 5/50* (2013.01); *G06T 5/20* (2013.01); *G06T 7/11* (2017.01); *G06T 7/136* (2017.01);
(Continued)

(58) Field of Classification Search
USPC ........................................... 382/173
See application file for complete search history.

(56) References Cited

U.S. PATENT DOCUMENTS 10,628,930 B1 4/2020 Periaswamy
2005/0232506 A1* 10/2005 Smith ............... G06T 7/136
382/254

(Continued)

FOREIGN PATENT DOCUMENTS

CN 105122301 A 12/2015
CN 105447837 3/2016
(Continued)

OTHER PUBLICATIONS

"Chinese Application Serial No. 202080102075.4 Office Action mailed on Mar. 3, 2025", 15 pgs.
(Continued)

*Primary Examiner* — Chineyere Wills-Burns
*Assistant Examiner* — Aaron Timothy Bonansinga
(74) *Attorney, Agent, or Firm* — Schwegman Lundberg & Woessner, P.A.

(57) ABSTRACT

A method of processing an image includes: acquiring a first image for a target object by using a first imaging method (S110); acquiring a second image for the target object by using a second imaging method (S120); constructing a first sub-image and a second sub-image based on the first image (S130); constructing a third sub-image and a fourth sub-image based on the second image (S140); and determining a pixel value distribution information of a fused image based (Continued)

on a pixel value distribution information of each of the first sub-image, the second sub-image, the third sub-image, and the fourth sub-image, so as to obtain the fused image (S150). An apparatus of processing an image, a computing device, and a computer-readable storage medium are further provided.

17 Claims, 15 Drawing Sheets

(51) Int. Cl.
    *G06T 7/11*         (2017.01)
    *G06T 7/136*      (2017.01)
(52) U.S. Cl.
    CPC ............ *G06T 2207/10088* (2013.01); *G06T 2207/10104* (2013.01); *G06T 2207/10108* (2013.01); *G06T 2207/20221* (2013.01)

(56) References Cited

U.S. PATENT DOCUMENTS

| | | | | |
|---|---|---|---|---|
| 2009/0115718 A1* | 5/2009 | Qiao | .................... | G09G 3/3611 |
| | | | | 345/102 |
| 2010/0166281 A1* | 7/2010 | Burger | ................... | A61B 6/507 |
| | | | | 382/131 |
| 2010/0191124 A1* | 7/2010 | Prokoski | ................ | A61B 5/411 |
| | | | | 600/473 |
| 2011/0170781 A1* | 7/2011 | Bronstein | ................ | G06T 7/33 |
| | | | | 382/190 |
| 2013/0315505 A1* | 11/2013 | Atkins | ................... | G06T 3/4007 |
| | | | | 382/300 |
| 2015/0049957 A1* | 2/2015 | Carmel | .................. | H04N 19/17 |
| | | | | 382/239 |
| 2017/0365046 A1* | 12/2017 | Tezaur | ...................... | G06T 5/20 |
| 2018/0018770 A1* | 1/2018 | Hu | ............................. | G06T 7/33 |
| 2019/0110054 A1* | 4/2019 | Su | ........................ | H04N 19/154 |
| 2019/0139236 A1 | 5/2019 | Cheng et al. | | |
| 2019/0371016 A1* | 12/2019 | Wang | .................... | G06T 11/006 |
| 2021/0217186 A1* | 7/2021 | Li | .......................... | G06T 3/4038 |

FOREIGN PATENT DOCUMENTS

| | | |
|---|---|---|
| CN | 106056565 A | 10/2016 |
| CN | 107527359 A | 12/2017 |
| CN | 107945168 A | 4/2018 |
| CN | 109146993 A | 1/2019 |
| CN | 110211081 | 9/2019 |
| CN | 110796630 A | 2/2020 |

OTHER PUBLICATIONS

Dayan, Yu, "Research on Fusion Algorithm of Multi-source Images", A Master Thesis Submitted to University of Electronic Science and Technology of China w English abstract, (2018), 78 pgs.
Yin, Ming, "Medical Image Fusion With Parameter-Adaptive Pulse Coupled Neural Network in Nonsubsampled Shearlet Transform Domain", IEEE Transactions on Instrumentation and Measurement, vol. 68, No. 1, Jan. 2019, (Jan. 2019), 16 pgs.
"International Application Serial No. PCT/CN2020/100634, International Search Report dated Apr. 6, 2021", (Apr. 6, 2021), 3 pgs.
"International Application Serial No. PCT/CN2020/100634, Written Opinion dated Apr. 6, 2021", (Apr. 6, 2021), 5 pgs.

\* cited by examiner

| 0 | 1 | 0 |
|---|---|---|
| 1 | 1 | 0 |
| 0 | 1 | 0 |

First weight matrix $W_{pet\_1}$

FIG. 5

| $W_{pet\_2}^{11}$ | 0 | $W_{pet\_2}^{13}$ |
|---|---|---|
| 0 | 0 | $W_{pet\_2}^{23}$ |
| $W_{pet\_2}^{31}$ | 0 | $W_{pet\_2}^{33}$ |

Second weight matrix $W_{pet\_2}$

FIG. 6

| 1 | 1 | 1 |
|---|---|---|
| 1 | 1 | 1 |
| 1 | 1 | 1 |

Second specific matrix $W_1$

| $W_{pet\_2}^{11}$ | 1 | $W_{pet\_2}^{13}$ |
|---|---|---|
| 1 | 1 | $W_{pet\_2}^{23}$ |
| $W_{pet\_2}^{31}$ | 1 | $W_{pet\_2}^{33}$ |

First specific matrix $W_{pet}$

| $1-W_{pet\_2}^{11}$ | 0 | $1-W_{pet\_2}^{13}$ |
|---|---|---|
| 0 | 0 | $1-W_{pet\_2}^{23}$ |
| $1-W_{pet\_2}^{31}$ | 0 | $1-W_{pet\_2}^{33}$ |

Third weight matrix $W_{mri\_1}$

FIG. 7

|   |   |   |
|---|---|---|
| 0 | 1 | 0 |
| 1 | 0 | 1 |
| 0 | 1 | 0 |

Fourth weight matrix $W_{mri\_2}$

FIG. 8

|   |   |   |
|---|---|---|
| $W_{h\_mri}$ | $W_{h\_mri}$ | $W_{h\_mri}$ |
| $W_{h\_mri}$ | $W_{h\_mri}$ | $W_{h\_mri}$ |
| $W_{h\_mri}$ | $W_{h\_mri}$ | $W_{h\_mri}$ |

Fifth weight matrix $W_{H\_mri}$

FIG. 9

METHOD AND APPARATUS OF PROCESSING IMAGE, COMPUTING DEVICE, AND MEDIUM

PRIORITY APPLICATIONS

This application is a U.S. National Stage Filing under 35 U.S.C. § 371 from International Application No. PCT/CN2020/100634, filed on Jul. 7, 2020, and published as WO2022/006738 on Jan. 13, 2022; the benefit of priority of which is hereby claimed herein, and which application and publication are hereby incorporated herein by reference in their entirety.

TECHNICAL FIELD

The present disclosure relates to a field of computer technology, in particular to a method of processing an image, an apparatus of processing an image, a computing device, a computer-readable storage medium and a computer program product.

BACKGROUND

In practical applications, different images may be acquired by different imaging methods. Since different imaging methods have different imaging characteristics, different images acquired for a target object by different imaging methods have different information of the target object. In order to obtain an image with relatively complete information of the target object, it is desired to fuse the images acquired by different imaging methods to obtain a fused image, so that the information of the target object contained in the fused image is more complete.

In a process of achieving the concept of the present disclosure, the inventor has found that there are at least following problems in the related art.

When the image fusion method in the related art is used for image fusion, there are problems of unclear target object outline, fuzzy target object, loss of the details of the target object and the like in the fused image, which lead to poor image fusion quality.

SUMMARY

In view of the above, the present disclosure provides a method of processing an image, a computing device, and a medium.

According to an aspect of the present disclosure, there is provided a method of processing an image, including: acquiring a first image for a target object by using a first imaging method; acquiring a second image for the target object by using a second imaging method; constructing a first sub-image and a second sub-image based on the first image; constructing a third sub-image and a fourth sub-image based on the second image; and determining a pixel value distribution information of a fused image based on a pixel value distribution information of each of the first sub-image, the second sub-image, the third sub-image, and the fourth sub-image, so as to obtain the fused image.

According to embodiments of the present disclosure, the above-mentioned constructing a first sub-image and a second sub-image based on the first image includes: determining a first segmentation threshold based on a pixel value distribution information of the first image; determining, based on the first segmentation threshold, a category that each pixel point in the first image belongs to, wherein the category includes a first category and a second category; constructing the first sub-image according to a pixel point belonging to the first category in the first image; and constructing the second sub-image according to a pixel point belonging to the second category in the first image.

According to embodiments of the present disclosure, the above-mentioned determining, based on the first segmentation threshold, a category that each pixel point in the first image belongs to includes: for each pixel point in the first image, determining whether a pixel value of the pixel point is greater than the first segmentation threshold; determining that the pixel point belongs to the first category when the pixel value of the pixel point is greater than the first segmentation threshold; and determining that the pixel point belongs to the second category when the pixel value of the pixel point is not greater than the first segmentation threshold.

According to embodiments of the present disclosure, the above-mentioned determining a first segmentation threshold based on a pixel value distribution information of the first image includes: determining a first coefficient; calculating, based on the pixel value distribution information of the first image, a first threshold by using a maximum between-class variance algorithm; and determining the first segmentation threshold based on the first coefficient and the first threshold.

According to embodiments of the present disclosure, the above-mentioned constructing a third sub-image and a fourth sub-image based on the second image includes: performing a filtering treatment on a pixel value distribution information of the second image, so as to determine a pixel value change rate of each pixel point relative to an adjacent pixel point in the second image; for each pixel point in the second image, determining whether a pixel value change rate of the pixel point is less than a preset change rate; determining that the pixel point belongs to a third category when the pixel value change rate of the pixel point is less than the preset change rate; determining the pixel point belongs to a fourth category when the pixel value change rate of the pixel point is not less than the preset change rate; constructing the third sub-image according to the pixel point belonging to the third category in the second image; and constructing the fourth sub-image according to the pixel point belonging to the fourth category in the second image.

According to embodiments of the present disclosure, the above-mentioned performing a filtering treatment on a pixel value distribution information of the second image includes: performing the filtering treatment on the pixel value distribution information of the second image by using a weighted least squares filter.

According to embodiments of the present disclosure, the above-mentioned method further includes: determining a second segmentation threshold based on a pixel value distribution information of the second image; for a pixel point in a plurality of pixel points of the fourth sub-image: determining a first enhancement coefficient based on a pixel value of a pixel point in the second image, the second segmentation threshold, and a first predetermined function, wherein the pixel point in the second image matches a position information of the pixel point in the plurality of pixel points of the fourth sub-image; acquiring a pixel value of a pixel point in the first image as a second enhancement coefficient, wherein the pixel point in the first image matches the position information of the pixel point in the plurality of pixel points of the fourth sub-image; determining an enhancement pixel value of the pixel point in the plurality of pixel points of the fourth sub-image based on a pixel value of the pixel point in the plurality of pixel points of the fourth sub-image, the first enhancement coefficient, and the second enhancement coefficient; and constructing a fifth sub-image based on the enhancement pixel value of each of the plurality of pixel points of the fourth sub-image.

According to embodiments of the present disclosure, the above-mentioned first predetermined function includes a monotone decreasing function.

According to embodiments of the present disclosure, the above-mentioned determining a second segmentation threshold based on a pixel value distribution information of the second image includes: determining a second coefficient; calculating, based on the pixel value distribution information of the second image, a second threshold by using a maximum between-class variance algorithm; and determining the second segmentation threshold based on the second coefficient and the second threshold.

According to embodiments of the present disclosure, the above-mentioned method further includes: respectively determining a first weight matrix of the first sub-image, a second weight matrix of the second sub-image, a third weight matrix of the third sub-image, a fourth weight matrix of the fourth sub-image, and a fifth weight matrix of the fifth sub-image; wherein the determining a pixel value distribution information of a fused image includes: performing weighted summation on pixel values of pixel points for a position in the first sub-image, the second sub-image, the third sub-image, the fourth sub-image, and the fifth sub-image by using weight values for the position in the first weight matrix, the second weight matrix, the third weight matrix, the fourth weight matrix and the fifth weight matrix, so as to determine a pixel value for the position in the fused image.

According to embodiments of the present disclosure, the determining a first weight matrix of the first sub-image includes: setting a first weight value which matches the pixel point belonging to the first category in the first sub-image to be 1; setting a first weight value which matches a pixel point other than the pixel point belonging to the first category in the first sub-image to be 0; and constructing the first weight matrix based on the first weight value.

According to embodiments of the present disclosure, the determining a second weight matrix of the second sub-image includes: for a pixel point belonging to the second category in the second sub-image, determining a first specific value based on a pixel value of the pixel point belonging to the second category in the second sub-image, the first segmentation threshold, and a second predetermined function; setting a second weight value which matches the pixel point belonging to the second category in the second sub-image to be the first specific value; setting a second weight value which matches a pixel point other than the pixel point belonging to the second category in the second sub-image to be 0; and constructing the second weight matrix based on the second weight value.

According to embodiments of the present disclosure, the determining a third weight matrix of the third sub-image includes: performing matrix addition on the first weight matrix and the second weight matrix, so as to obtain a first specific matrix; and performing matrix subtraction on a second specific matrix and the first specific matrix, so as to obtain the third weight matrix, wherein each element in the second specific matrix is 1.

According to embodiments of the present disclosure, the determining a fourth weight matrix of the fourth sub-image includes: setting a third weight value which matches a pixel point belonging to the fourth category in the fourth sub-image to be 1; and constructing the fourth weight matrix based on the third weight value.

According to embodiments of the present disclosure, the determining a fifth weight matrix of the fifth sub-image includes: determining a luminance value corresponding to a pixel value of each pixel point in the first image; determining a mean value of luminance values of a plurality of pixel points in the first image; determining a second specific value according to the mean value; setting a fourth weight value which matches each pixel point in the fifth sub-image to be the second specific value; and constructing the fifth weight matrix based on the fourth weight value.

According to embodiments of the present disclosure, the above-mentioned first imaging method includes positron emission computed tomography or single-photon emission computed tomography, and the second imaging method includes magnetic resonance imaging.

According to another aspect of the present disclosure, there is provided a computing device, including: one or more processors; and a storage apparatus for storing one or more programs, wherein the one or more programs, when executed by the one or more processors, cause the one or more processors to implement the method described above.

According to another aspect of the present disclosure, there is provided a computer-readable storage medium having computer executable instructions stored thereon, wherein the instructions are used for implementing the method described above when executed.

BRIEF DESCRIPTION OF THE DRAWINGS

The above and other objectives, features and advantages of the present disclosure will become more apparent from the following description of the embodiments of the present disclosure with reference to the accompanying drawings, wherein:

FIG. 5 to FIG. 9 schematically show schematic diagrams of determining weight matrices according to embodiments of the present disclosure;

DETAILED DESCRIPTION OF EMBODIMENTS

Figure 1:
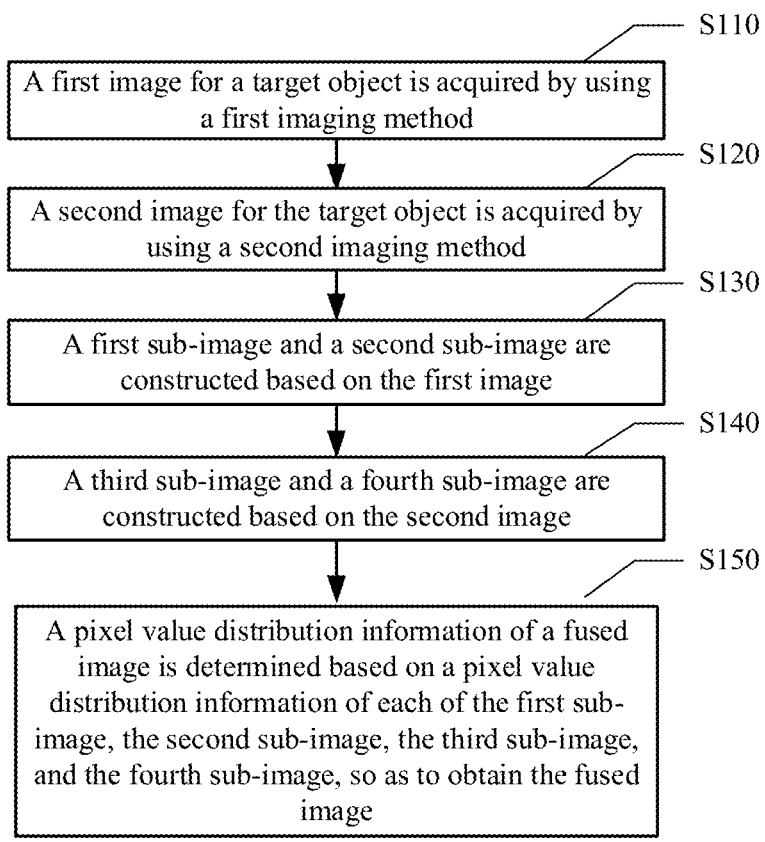
FIG. 1 schematically shows a flowchart of a method of processing an image according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms "comprising", "including" and the like used herein specify a presence of the feature, step, operation and/or component, but do not preclude a presence or addition of one or more other features, steps, operations, or components.

All terms (including technical and scientific terms) used herein have the same meaning as commonly understood by those skilled in the art, unless otherwise defined. It should be noted that the terms used herein should be construed to have meanings consistent with the context of the present description and should not be construed in an idealized or overly rigid manner.

When an expression like "at least one of A, B, and C, etc." is used, it should generally be interpreted in accordance with the meaning of the expression as commonly understood by those skilled in the art (e.g., "a system having at least one of A, B and C" should include, but not be limited to, a system having A alone, having B alone, having C alone, having A and B, having A and C, having B and C, and/or having A, B, and C, etc.).

Generally, image fusion may be performed based on multi-scale transformation. For example, multi-scale decomposition is performed on a source image to obtain a plurality of sub-band coefficients in different scales and directions, and then a certain fusion rule is adopted to fuse the plurality of sub-band coefficients to obtain a fused image. Multi-scale transformation theory may be applied to the field of image fusion since the multi-scale transformation theory conforms to human visual characteristics and may express an essential information of an image.

Conventional multi-scale transformation mainly includes Laplacian Pyramid Blending and Discrete Wavelet Transform. Taking discrete wavelet transform as an example, the discrete wavelet transform method is to decompose the source image into a high-frequency sub-image and a low-frequency sub-image through discrete wavelet transform. A high-frequency part adopts the way of taking a large value of an absolute value of a direction, so as to effectively save a detailed texture information of the image. A low-frequency part uses a region energy ratio fusion rule, so as to save most information of the image. Then, the sub-images are reconstructed into the fused image by inverse discrete wavelet transform. As a two-dimensional transformation tool, multi-scale geometric analysis (MGA) may better represent information of an edge, a curve, a straight line, a texture, and the like of the image. MGA includes, for example, typical contour wave transformation and shear wave transformation. In addition, representative image fusion algorithms further include nonsubsampled contourlet transform (NSCT) algorithm and adaptive sparse representation algorithm. NSCT is an improved form of contourlet transform. NSCT has translation invariance and does not produce Gibbs effect.

However, the image fusion algorithm in related art has a problem of poor fusion quality in image fusion. For example, since the direction number of discrete wavelet transform is limited, an extraction effect of the texture, the edge, and the like of the image is poor. In a process of wavelet decomposition and reconstruction, a false contour is generated at the edge of the image due to a vibration of a filter, which affects a fusion effect. Although the nonsubsampled contourlet transform algorithm is conducive to better preserving the edge information and contour structure of the image to enhance the translation invariance of the image, the fused image obtained is fuzzy and some detailed textures are lost.

In view of the poor fusion quality of the image fusion algorithm of the related art, embodiments of the present disclosure provide a method of processing an image, which fuses the image through the method of processing an image of embodiments of the present disclosure, and improves a quality of the fused image. The specific implementation process of the method of processing an image of embodiments of the present disclosure will be described below.

Embodiments of the present disclosure provide a method of processing an image, including: acquiring a first image for a target object by using a first imaging method; acquiring a second image for the target object by using a second imaging method; constructing a first sub-image and a second sub-image based on the first image; constructing a third sub-image and a fourth sub-image based on the second image; and determining a pixel value distribution information of a fused image based on a pixel value distribution information of each of the first sub-image, the second sub-image, the third sub-image, and the fourth sub-image, so as to obtain the fused image.

According to embodiments of the present disclosure, using the method of processing an image of embodiments of the present disclosure may at least partially solve the problems of unclear target object outline, fuzzy target object, loss of the details of the target object and the like in the fused image and the resulting problem of poor image fusion quality when the image fusion method in the related art is used for image fusion. Therefore, a technical effect of improving the quality of the fused image may be achieved.

Figure 2:
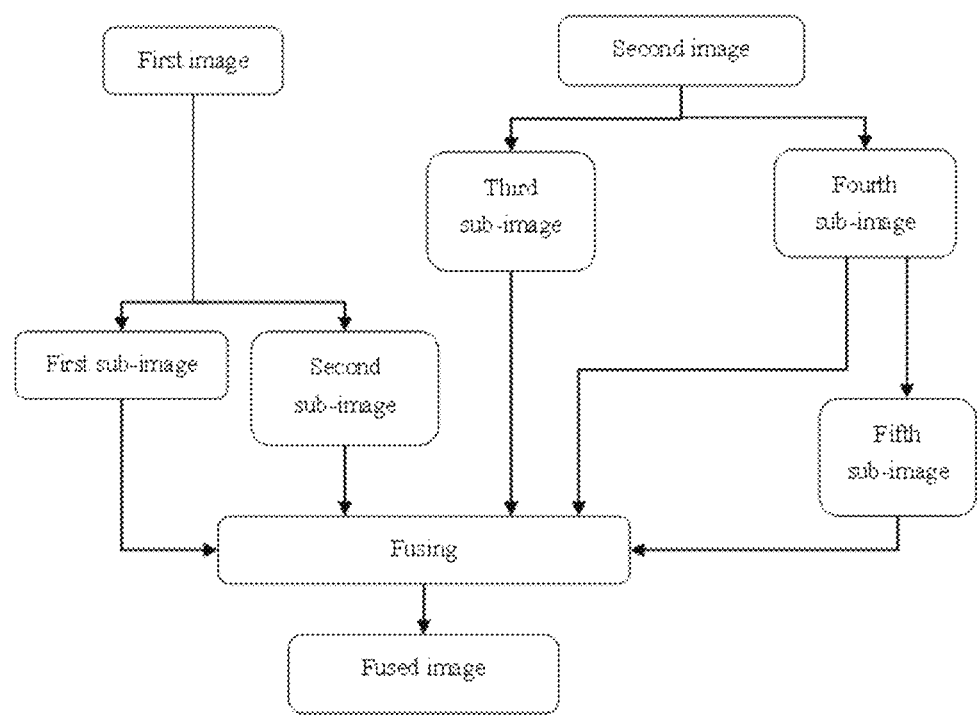
FIG. 2 schematically shows an overall frame diagram of a method of processing an image according to embodiments of the present disclosure.

FIG. 1 schematically shows a flowchart of a method of processing an image according to embodiments of the present disclosure. FIG. 2 schematically shows an overall frame diagram of a method of processing an image according to embodiments of the present disclosure. The method of processing an image in embodiments of the present disclosure will be described below in combination with FIG. 1 and FIG. 2.

As shown in FIG. 1, a method of processing an image in embodiments of the present disclosure includes, for example, the following operations S110 to S150.

In operation S110, a first image for a target object is acquired by using a first imaging method.

In operation S120, a second image for the target object is acquired by using a second imaging method.

According to embodiments of the present disclosure, the first imaging method may include nuclide imaging. The nuclide imaging may include Positron Emission Computed Tomography (PET) or Single-Photon Emission Computed Tomography (SPECT). The second imaging method may include magnetic resonance imaging (MRI).

The first imaging method has high imaging sensitivity, which may reach a nanogram molecular level, and may better acquire a functional information and a metabolic information of the target object. However, a spatial resolution of the first imaging method is relatively low. An imaging process of the first imaging method includes, for example, labeling a compound or a metabolic substrate with a nuclide and introducing a labeled compound or metabolic substrate into the target object, and the target object may perform a physiological metabolic activity based on the nuclide-labeled compound or metabolic substrate. Then, the first image of the target object performing the physiological metabolic activity is acquired through the first imaging method. The first image may represent the functional information and metabolic information of the target object.

An advantage of the second imaging method is high spatial resolution, which has an advantage in acquiring a structural information of the target object. The sensitivity of the second imaging method is relatively low, which may reach a microgram molecular level. The second image of the target object acquired by using the second imaging method has the structure information of the target object.

According to embodiments of the present disclosure, the first image for the target object is acquired by the first imaging method, wherein the first image includes the functional information and metabolic information of the target object. The second image for the target object is acquired by the second imaging method, wherein the second image includes the structure information of the target object. The first image and the second image may be used for fusion processing to obtain a fused image, so that the fused image combines the functional information and metabolic information of the first image and the structural information of the second image.

In operation S130, a first sub-image and a second sub-image are constructed based on the first image.

According to embodiments of the present disclosure, the image acquired by the first imaging method may be, for example, a gray image, and the first image may be obtained by pseudo color processing the gray image. Therefore, the first image is, for example, composed of a plurality of pixel points, and each pixel point may have a corresponding pixel value. Moreover, each pixel point may also have a corresponding gray value, which is a gray value of the corresponding pixel point in the gray image before pseudo color processing.

According to embodiments of the present disclosure, a first segmentation threshold may be determined based on a pixel value distribution information of the first image. The first segmentation threshold is, for example, a value greater than or equal to 0 and less than or equal to 255. Then, a category to which each pixel point in the first image belongs is determined based on the first segmentation threshold. Two categories may include a first category and a second category.

For example, for each pixel point in the first image, it is determined whether a pixel value of the pixel point is greater than the first segmentation threshold. It is determined that the pixel point belongs to the first category when the pixel value of the pixel point is greater than the first segmentation threshold. It is determined that the pixel point belongs to the second category when the pixel value of the pixel point is not greater than the first segmentation threshold.

Then, the first sub-image is constructed according to the pixel point belonging to the first category in the first image, and the second sub-image is constructed according to the pixel point belonging to the second category in the first image.

According to embodiments of the present disclosure, the constructed first sub-image includes, for example, important functional information and metabolic information of the first image. The functional information and metabolic information contained in the constructed second sub-image may be ignored. That is, an amount of functional information and metabolic information contained in the first sub-image is far greater than an amount of functional information and metabolic information contained in the second sub-image. When the first image is a color image obtained through pseudo color processing, the first sub-image includes most of a color information of the first image, and the second sub-image includes a smaller amount of the color information.

According to embodiments of the present disclosure, an image size of the first image may be, for example, 256*256, 512*512, and the like. When the image size of the first image is 256*256, the number of pixel points that may represent the first image is 256*256=65536. When the image size of the first image is 512*512, the number of pixel points that may represent the first image is 512*512=262144.

Figure 3:
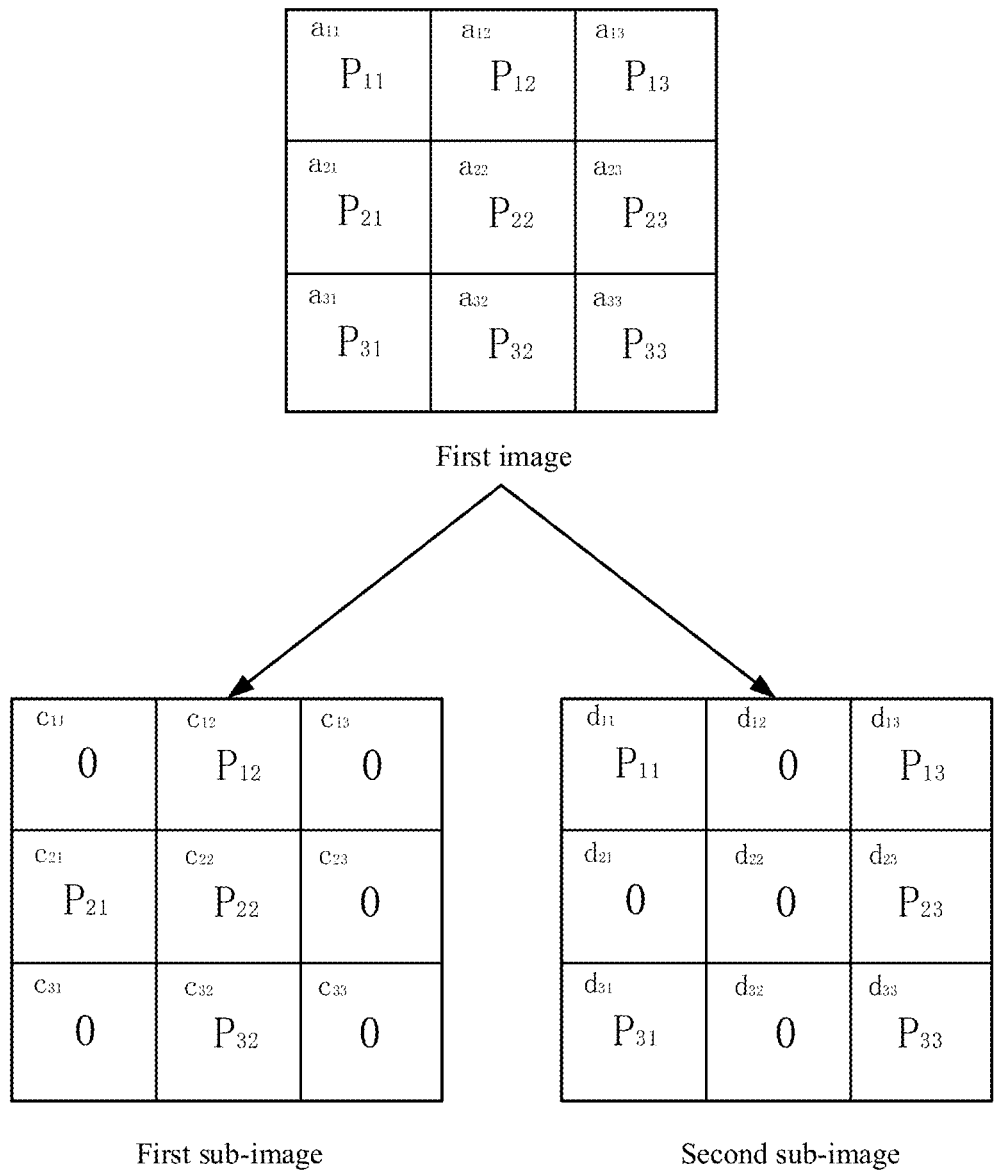
FIG. 3 schematically shows a schematic diagram of constructing a first sub-image and a second sub-image according to embodiments of the present disclosure.

FIG. 3 schematically shows a schematic diagram of constructing a first sub-image and a second sub-image according to embodiments of the present disclosure.

A specific implementation process of operation S130 will be described below with reference to FIG. 3.

In order to facilitate understanding a process of constructing the first sub-image and the second sub-image based on the first image in embodiments of the present disclosure, embodiments of the present disclosure take the image size of the first image being 3*3 as an example.

As shown in FIG. 3, the first image includes, for example, 9 pixel points, which may be represented as $a_{11}$ to $a_{33}$ respectively. Pixel values corresponding to the pixel points $a_{11}$ to $a_{33}$ are $P_{11}$ to $P_{33}$. The first segmentation threshold is represented as $T_{Hper}$, for example. When pixel values $P_{12}$, $P_{21}$, $P_{22}$ and $P_{32}$ corresponding to pixel points $a_{12}$, $a_{21}$, $a_{22}$ and $a_{32}$ are greater than the first segmentation threshold $T_{Hper}$, it is determined that the pixel points $a_{12}$, $a_{21}$, $a_{22}$ and $a_{32}$ belong to the first category.

Then, the first sub-image is constructed according to the pixel points belonging to the first category. For example, the first sub-image is constructed according to pixel values and position information corresponding to each pixel point in the first category, and the first sub-image includes, for example, pixel points $c_{11}$ to $c_{33}$. In the first sub-image, pixel points corresponding to the pixel points $a_{12}$, $a_{21}$, $a_{22}$ and $a_{32}$ are, for example, $c_{12}$, $c_{21}$, $c_{22}$ and $c_{32}$. Pixel values of the pixel points $c_{12}$, $c_{21}$, $c_{22}$ and $c_{32}$ in the first sub-image, for example, are the same as the pixel values of the pixel points $a_{12}$, $a_{21}$, $a_{22}$ and $a_{32}$ in the first image respectively. Pixel values of other pixel points in the first sub-image except for the pixel points $c_{12}$, $c_{21}$, $c_{22}$ and $c_{32}$, for example, are all set to 0.

Similarly, a construction process of the second sub-image is similar to the construction process of the first sub-image.

For example, in the first image, pixel values $P_{11}$, $P_{13}$, $P_{23}$, $P_{31}$, and $P_{33}$ corresponding to pixel points $a_{11}$, $a_{13}$, $a_{23}$, $a_{31}$, and $a_{33}$ are all less than or equal to the first segmentation threshold $T_{Hper}$, and it is determined that the pixel points $a_{11}$, $a_{13}$, $a_{23}$, $a_{31}$, and $a_{33}$ belong to the second category.

Then, the second sub-image is constructed according to the pixel points belonging to the second category. For example, the second sub-image is constructed according to pixel values and position information corresponding to each pixel point in the second category, and the second sub-image includes, for example, pixel points $d_{11}$ to $d_{33}$. In the second sub-image, pixel points corresponding to pixel points $a_{11}$, $a_{13}$, $a_{23}$, $a_{31}$ and $a_{33}$ are, for example, $d_{11}$, $d_{13}$, $d_{23}$, $d_{31}$ and $d_{33}$. Pixel values of the pixel points $d_{11}$, $d_{13}$, $d_{23}$, $d_{31}$ and $d_{33}$ in the second sub-image, for example, are the same as the pixel values of the pixel points $a_{11}$, $a_{13}$, $a_{23}$, $a_{31}$ and $a_{33}$ in the first image respectively. Pixel values of other pixel points in the second sub-image except for the pixel points $d_{11}$, $d_{13}$, $d_{23}$, $d_{31}$ and $d_{33}$, for example, are all set to 0.

When a pixel value of a pixel point is compared with the first segmentation threshold $T_{Hpet}$, a gray value of the pixel point may be compared with the first segmentation threshold $T_{Hpet}$.

According to embodiments of the present disclosure, determining the first segmentation threshold $T_{Hpet}$ based on the pixel value distribution information of the first image may include: calculating, based on the pixel value distribution information of the first image, the first segmentation threshold by using a maximum between-class variance algorithm. When calculating the first segmentation threshold $T_{Hpet}$, for example, the first segmentation threshold $T_{Hpet}$ may be calculated based on the pixel value of each pixel point of the first image, and the pixel value may include the gray value.

The principle of the maximum between-class variance algorithm is, for example, to divide all pixel points in the first image into the first category and the second category, so that a variance between gray values corresponding to the pixel points in the first category and gray values corresponding to the pixel points in the second category is maximum. A calculation equation of the first segmentation threshold $T_{Hpet}$ is, for example, Equation (1).

$$T_{Hpet} = W_{Tpet} \times T_{pet}, \text{if } T_{Hpet} > 255, T_{Hpet} = 255 \tag{1}$$

$W_{Tpet}$ is a first coefficient, and a value of the first coefficient is an empirical value. Generally, $W_{Tpet} \in [1,2]$; $T_{pet}$ is a first threshold calculated based on the maximum between-class variance method. The first segmentation threshold $T_{Hpet}$ may be determined based on the first coefficient $W_{Tpet}$ and the first threshold $T_{pet}$.

In operation S140, a third sub-image and a fourth sub-image are constructed based on the second image.

According to embodiments of the present disclosure, for example, a filtering treatment is performed on a pixel value distribution information of the second image, so as to determine a pixel value change rate of each pixel point relative to an adjacent pixel point in the second image. For example, the filtering treatment is performed on the pixel value distribution information of the second image by using a weighted least squares filter.

Then, for each pixel point in the second image, it is determined whether a pixel value change rate of the pixel point is less than a preset change rate. It is determined that the pixel point belongs to a third category when the pixel value change rate of the pixel point is less than the preset change rate. It is determined the pixel point belongs to a fourth category when the pixel value change rate of the pixel point is not less than the preset change rate. The preset change rate may be set as required in practice.

The determining the pixel value change rate of each pixel point relative to the adjacent pixel point in the second image includes, for example, making a difference between a pixel value of a pixel point in the second image and pixel values of a plurality of adjacent pixel points adjacent to the pixel point to obtain a plurality of pixel differences corresponding to the plurality of adjacent pixel points, and weighted summing the plurality of pixel differences to obtain the pixel value change rate of the pixel point.

Next, the third sub-image is constructed according to a pixel point belonging to the third category in the second image, and the fourth sub-image is constructed according to a pixel point belonging to the fourth category in the second image.

It may be understood that, the filtering treatment is performed on the pixel value distribution information of the second image, so that the pixel points in the second image may be classified according to the pixel value change rate of each pixel point. A pixel value change rate of the pixel point belonging to the third category relative to an adjacent pixel point is relatively small, so that the constructed third sub-image includes a smoothing information in the second image. A pixel value change rate of the pixel point belonging to the fourth category relative to an adjacent pixel point is relatively large, so that the constructed fourth sub-image includes a texture information in the second image.

According to embodiments of the present disclosure, an image size of the second image may be, for example, 256*256, 512*512, and the like. When the image size of the second image is 256*256, the number of pixel points that may represent the second image is 256*256=65536. When the image size of the second image is 512*512, the number of pixel points that may represent the second image is 512*512=262144.

Figure 4:
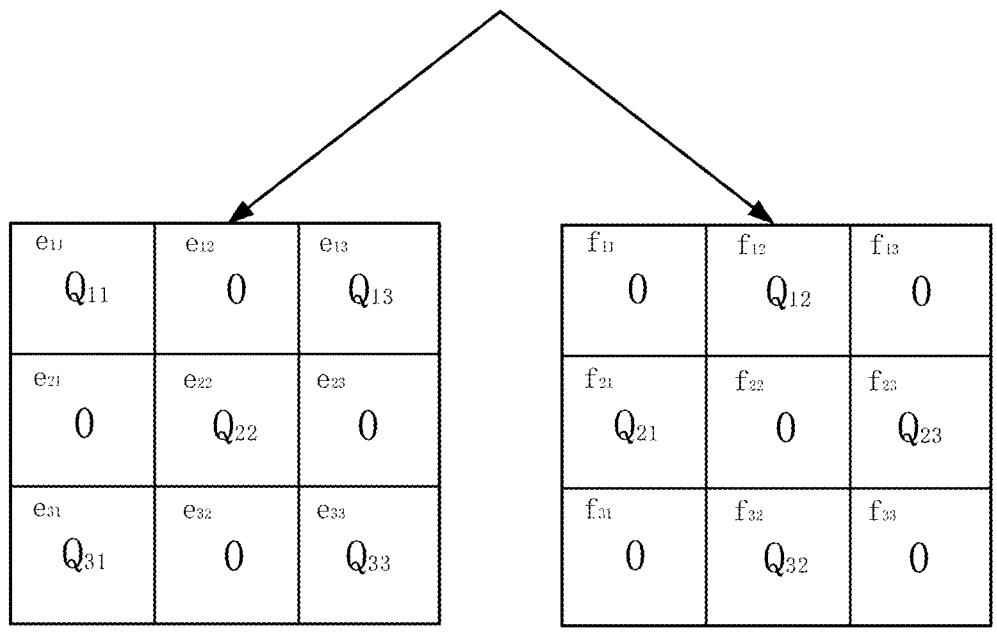
FIG. 4 schematically shows a schematic diagram of constructing a third sub-image and a fourth sub-image according to embodiments of the present disclosure.
Figure 10:
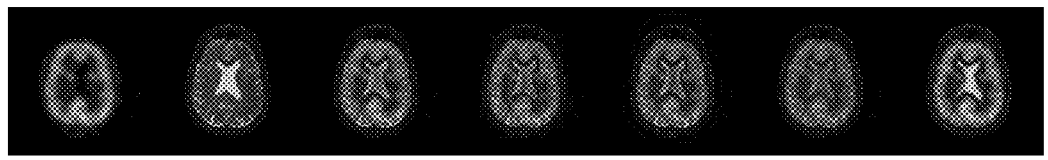
FIG. 10 to FIG. 45 schematically show schematic diagrams of experimental results according to embodiments of the present disclosure.
Figure 11:
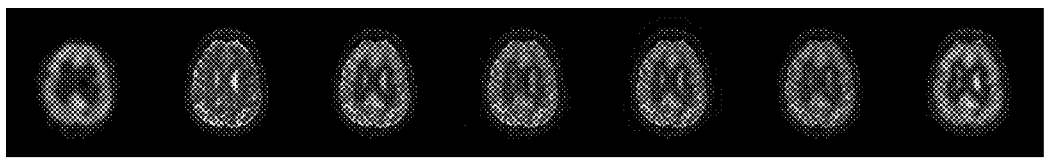
Figure 12:
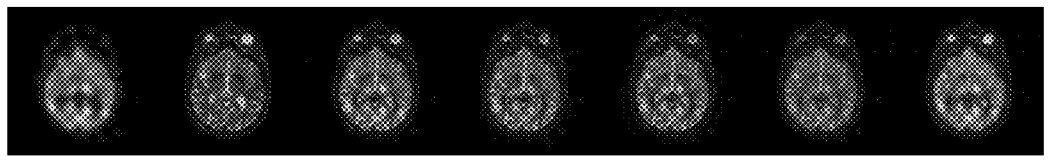
Figure 13:
Figure 14:
Figure 15:
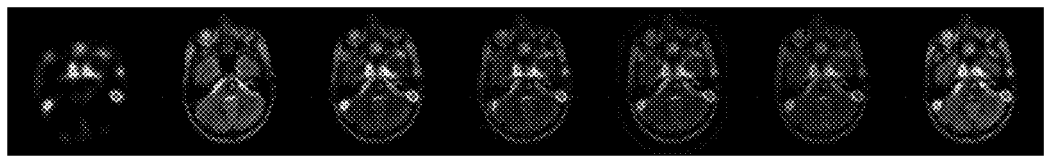
Figure 16:
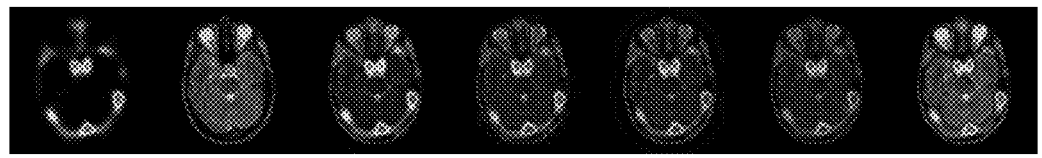
Figure 17:
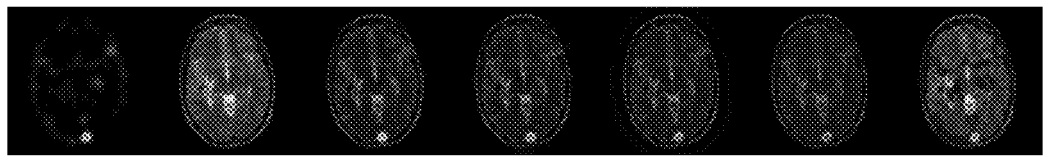
Figure 18:
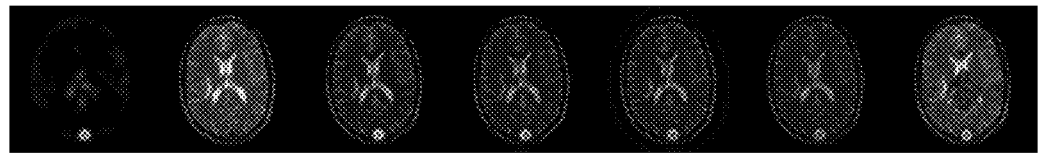
Figure 19:
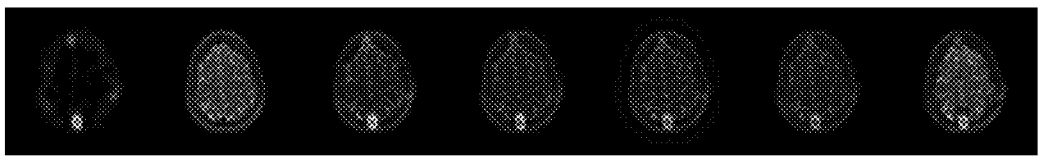
Figure 20:
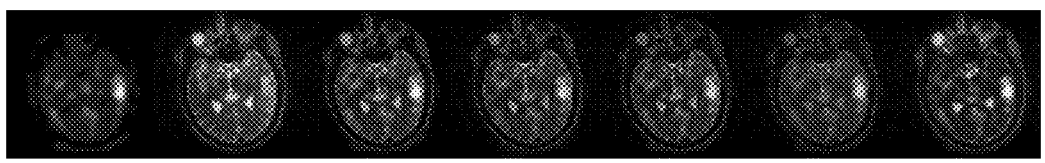
Figure 21:
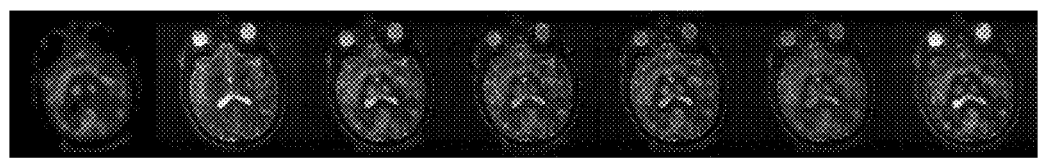
Figure 22:
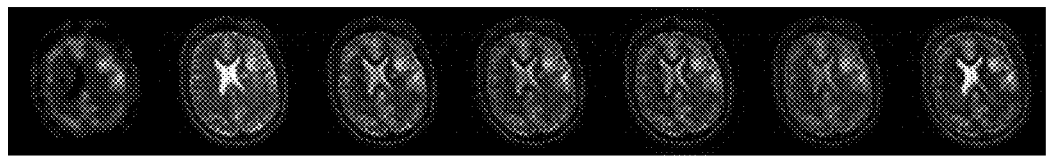
Figure 23:
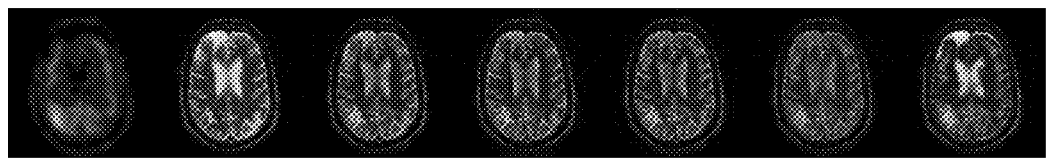
Figure 24:
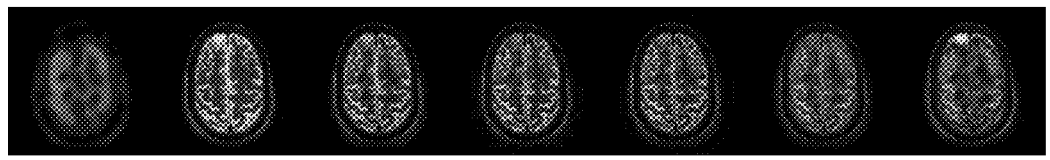
Figure 25:
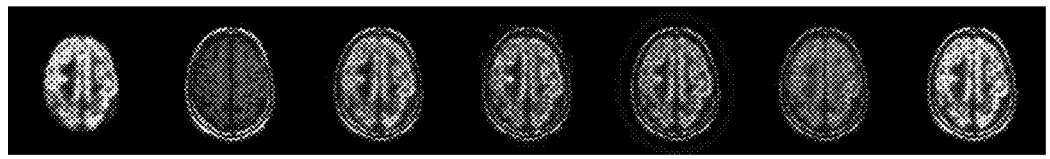
Figure 26:
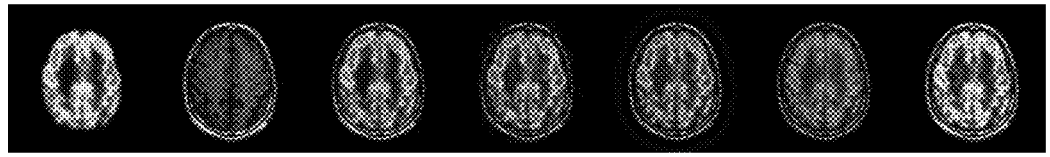
Figure 27:
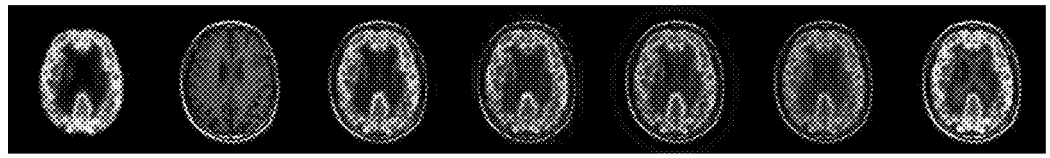
Figure 28:
Figure 29:
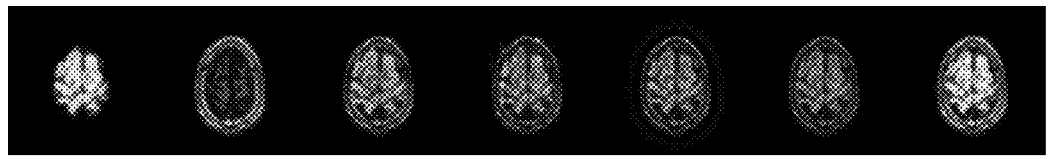
Figure 30:
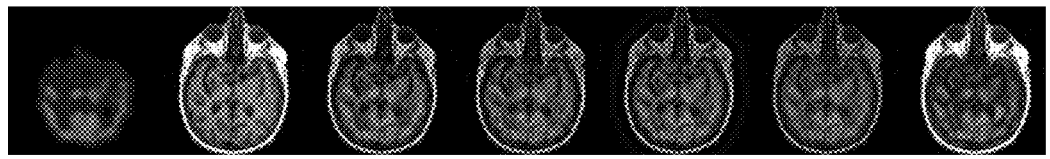
Figure 31:
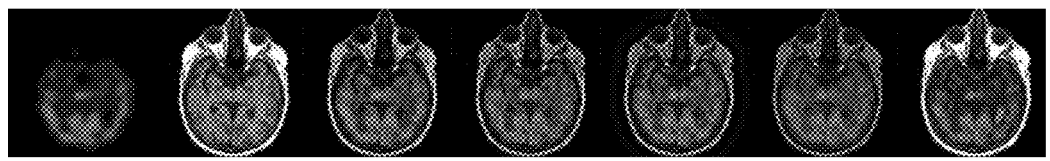
Figure 32:
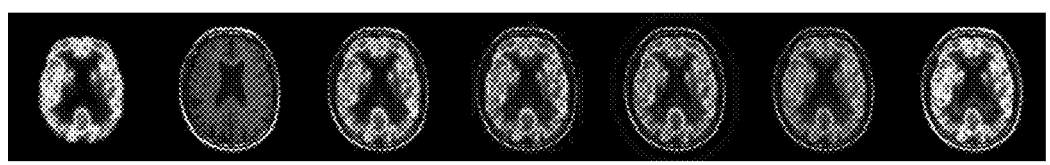
Figure 33:
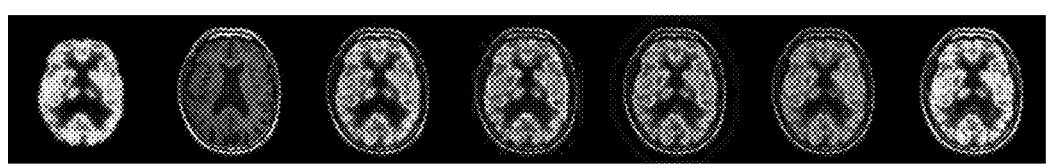
Figure 34:
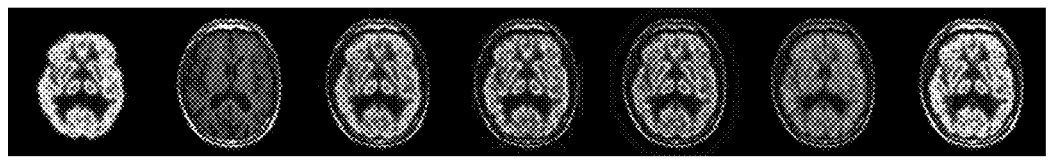
Figure 35:
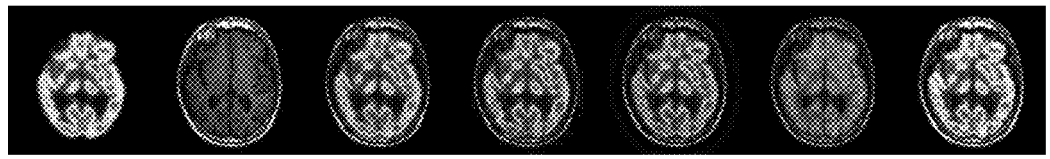
Figure 36:
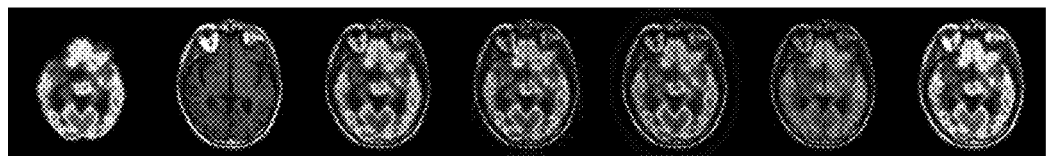
Figure 37:
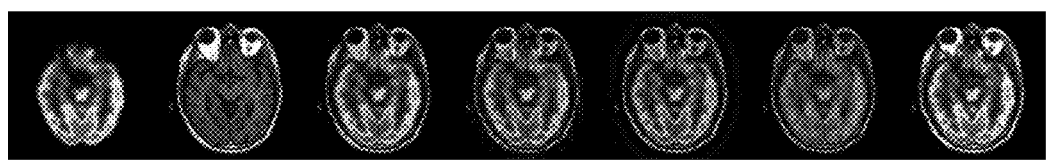
Figure 38:
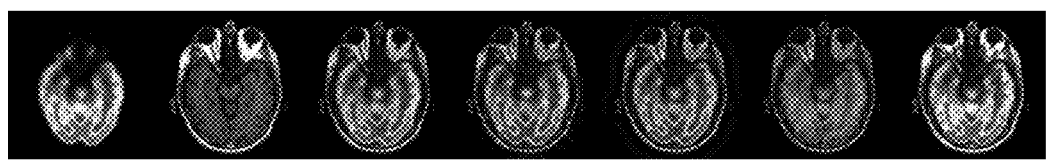
Figure 39:
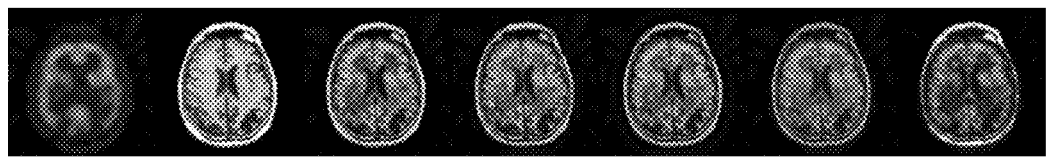
Figure 40:
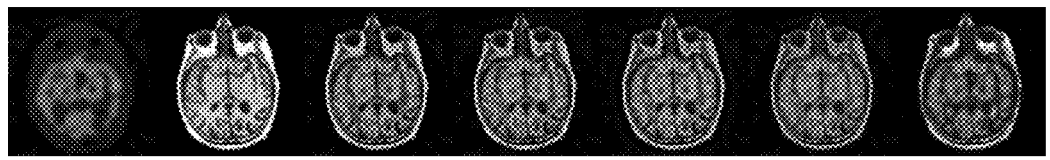
Figure 41:
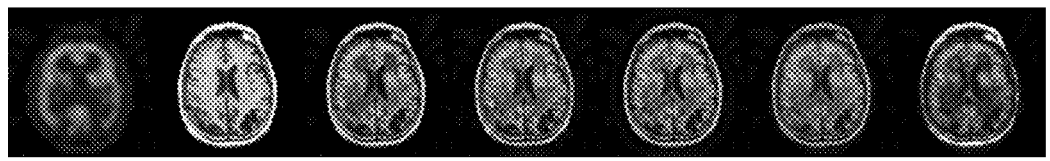
Figure 42:
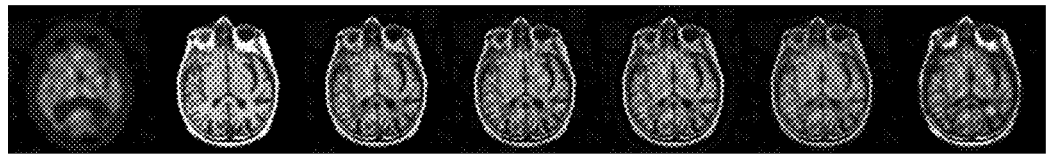
Figure 43:
Figure 44:
Figure 45:
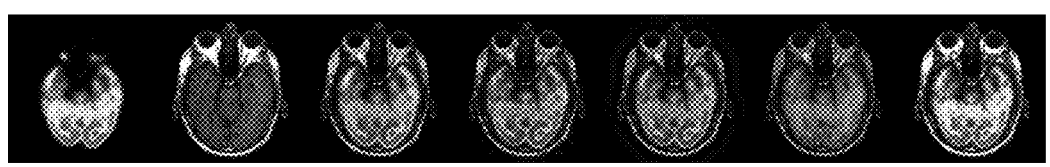

FIG. 4 schematically shows a schematic diagram of constructing a third sub-image and a fourth sub-image according to embodiments of the present disclosure.

A specific implementation process of operation S140 will be described below with reference to FIG. 4.

In order to facilitate understanding a process of constructing the third sub-image and the fourth sub-image based on the second image in embodiments of the present disclosure, embodiments of the present disclosure take the image size of the second image being 3*3 as an example.

As shown in FIG. 4, the first image includes, for example, 9 pixel points, which may be represented as $b_{11}$ to $b_{33}$ respectively. Pixel values corresponding to the pixel points $b_{11}$ to $b_{33}$ are $Q_{11}$ to $Q_{33}$. When change rates of pixel values $Q_{11}$, $Q_{13}$, $Q_{22}$, $Q_{31}$ and $Q_{33}$ corresponding to pixel points $b_{11}$, $b_{13}$, $b_{22}$, $b_{31}$ and $b_{33}$ are less than the preset change rate, it is determined that the pixel points $b_{11}$, $b_{13}$, $b_{22}$, $b_{31}$ and $b_{33}$ belong to the third category. The pixel value change rate may be, for example, a gray value change rate.

Then, the third sub-image is constructed according to the pixel points belonging to the third category. For example, the third sub-image is constructed according to pixel values and position information corresponding to each pixel point in the third category. The third sub-image includes, for example, pixel points $e_{11}$ to $e_{33}$. In the third sub-image, pixel points corresponding to the pixel points $b_{11}$, $b_{13}$, $b_{22}$, $b_{31}$ and $b_{33}$ are, for example, $e_{11}$, $e_{13}$, $e_{22}$, $e_{31}$ and $e_{33}$. Pixel values of the pixel points $e_{11}$, $e_{13}$, $e_{22}$, $e_{31}$ and $e_{33}$ in the third sub-image are, for example, the same as the pixel values of the pixel points $b_{11}$, $b_{13}$, $b_{22}$, $b_{31}$ and $b_{33}$ in the second image respectively. Pixel values of other pixel points in the third sub-image except for the pixel points $e_{11}$, $e_{13}$, $e_{22}$, $e_{31}$ and $e_{33}$ are, for example, all set to 0.

Similarly, a construction process of the fourth sub-image is similar to the construction process of the third sub-image.

For example, when change rates of pixel values $Q_{12}$, $Q_{21}$, $Q_{23}$, and $Q_{32}$ in the second image corresponding to the pixel points $b_{12}$, $b_{21}$, $b_{23}$, and $b_{32}$ are greater than or equal to the preset change rate, it is determined that the pixel points $b_{12}$, $b_{21}$, $b_{23}$, and $b_{32}$ belong to the fourth category.

Then, the fourth sub-image is constructed according to the pixel points belonging to the fourth category. For example, the fourth sub-image is constructed according to pixel values and position information corresponding to each pixel point in the fourth category. The fourth sub-image includes, for example, pixel points $f_{11}$ to $f_{33}$. In the fourth sub-image, pixel points corresponding to the pixel points $b_{12}$, $b_{21}$, $b_{23}$, and $b_{32}$ are, for example, $f_{12}$, $f_{21}$, $f_{23}$, and $f_{32}$. Pixel values of pixel points $f_{12}$, $f_{21}$, $f_{23}$ and $f_{32}$ in the fourth sub-image are, for example, the same as the pixel values of the pixel points $b_{12}$, $b_{21}$, $b_{23}$ and $b_{32}$ in the second image respectively. Pixel values of other pixel points in the fourth sub-image except for the pixel points $f_{12}$, $f_{21}$, $f_{23}$, and $f_{32}$ are, for example, all set to 0.

Next, in operation S150, a pixel value distribution information of a fused image is determined based on a pixel value distribution information of each of the first sub-image, the second sub-image, the third sub-image, and the fourth sub-image, so as to obtain the fused image.

Specifically, as shown in FIG. 2, an enhancement treatment may be performed on the fourth sub-image, so as to obtain a fifth sub-image. Then, a fusion treatment is performed on the first sub-image, the second sub-image, the third sub-image, the fourth sub-image and the fifth sub-image, so as to obtain the fused image.

A process of performing the enhancement treatment on the fourth sub-image to obtain the fifth sub-image will be described below.

First, a second segmentation threshold is determined based on a pixel value distribution information of the second image. A calculation process of the second segmentation threshold is, for example, similar to a calculation process of the first segmentation threshold.

The second segmentation threshold may be expressed as $T_{Hmri}$. The maximum between-class variance algorithm may be used to calculate the second segmentation threshold $T_{Hmri}$ based on the pixel value distribution information of the second image. The principle of the maximum between-class variance algorithm is, for example, to divide all pixel points in the second image into the third category and the fourth category, so that a variance between gray values corresponding to pixel points in the third category and gray values corresponding to pixel points in the fourth category is maximum. A calculation equation of the second segmentation threshold $T_{Hmri}$, for example, is Equation (2).

$$T_{Hmri} = W_{Tmri} \times T_{mri}, \text{ if } T_{Hmri} > 255, T_{Hmri} = 255 \tag{2}$$

$W_{Tmri}$ is a second coefficient, and a value of the second coefficient is an empirical value. Generally, $W_{Tmri} \in [1,2]$; $T_{mri}$ is a second threshold calculated based on the maximum between-class variance method. The second segmentation threshold $T_{Hmri}$ may be determined based on the second coefficient $W_{Tmri}$ and the second threshold $T_{mri}$.

According to embodiments of the present disclosure, i represents the i-th row in the fifth sub-image, and j represents the j-th column in the fifth sub-image. A pixel value of a pixel point in the i-th row and the j-th column of the fifth sub-image is expressed as $I_{H\_mri}^{ij}$, and a process of constructing the fifth sub-image may be expressed as Equation (3).

$$I_{H\_mri}^{ij} = I_{mri\_2}^{ij} \times \cos\left(\frac{0.5 \times I_{mri}^{ij}}{T_{Hmri}}\pi\right) \times I_{pet}^{ij} \tag{3}$$

$I_{mri\_2}^{ij}$ represents, for example, a pixel value of a pixel point in the i-th row and the j-th column of the fourth sub-image. $I_{mri}^{ij}$ represents, for example, a pixel value of a pixel point in the i-th row and the j-th column of the second image. $I_{pet}^{ij}$, represents, for example, a pixel value of a pixel point in the i-th row and the j-th column of the first image. Specifically, $I_{pet}^{ij}$ is for example, a numerical value obtained by normalizing the pixel value of the pixel point in the i-th row and the j-th column of the first image to an interval of [0,1]. In embodiments of the present disclosure, the image sizes of the first image, the second image, the first sub-image, the second sub-image, the third sub-image, the fourth sub-image and the fifth sub-image may all be the same.

The process of constructing the fifth sub-image will be described below in combination with Equation (3).

After determining the second segmentation threshold $T_{Hmri}$, for a pixel point in a plurality of pixel points of the fourth sub-image, wherein the pixel point is, for example, a pixel point in the i-th row and the j-th column of the fourth sub-image:

a first enhancement coefficient $$\cos\left(\frac{0.5 \times I_{mri}^{ij}}{T_{Hmri}}\pi\right)$$

is determined based on a pixel value $I_{mri}^{ij}$ of a pixel point in the second image, the second segmentation threshold $T_{Hmri}$, and a first predetermined function (a cosine function), wherein the pixel point in the second image matches a position information of the pixel point in the plurality of pixel points of the fourth sub-image. The first predetermined function may be a monotone decreasing function, such as a cosine function whose function input value is in an interval $[0, \pi/2]$. The pixel point in the second image which matches the position information of the pixel point in the plurality of pixel points of the fourth sub-image is embodied in: the position information of the pixel point in the plurality of pixel points of the fourth sub-image is the i-th row and j-th column in the fourth sub-image, and a position information of the pixel point in the second image which matches the position information of the pixel point in the plurality of pixel points of the fourth sub-image is also the i-th row and j-th column in the second image.

Then, a pixel value $I_{pet}^{ij}$ of a pixel point in the first image is acquired as a second enhancement coefficient, wherein the pixel point in the first image matches the position information of the pixel point in the plurality of pixel points of the fourth sub-image.

An enhancement pixel value of the pixel point in the plurality of pixel points of the fourth sub-image is determined based on the pixel value $I_{mri\_2}^{ij}$ of the pixel point in the plurality of pixel points of the fourth sub-image, the first enhancement coefficient, and the second enhancement coefficient. The enhancement pixel value may be used as a pixel value $I_{H\_mri}^{ij}$ of a pixel point in the fifth sub-image corresponding to the pixel point in the plurality of pixel points of the fourth sub-image.

After acquiring the enhancement pixel value of each pixel point in the fourth sub-image, the enhancement pixel value of each pixel point may be taken as a pixel value of the corresponding pixel point in the fifth sub-image. That is, a pixel value of the pixel point in the i-th row and the j-th column of the constructed fifth sub-image is expressed as $I_{H\_mri}^{ij}$;

According to Equation (3), the enhancement treatment may be performed on some pixel points of the fourth sub-image by Equation (3). For each pixel point in some pixel points, the pixel point meets the following two conditions:

(1) a pixel value of the pixel point is less than or equal to the second segmentation threshold.
(2) the pixel point corresponds to a pixel point in the first image whose pixel value is greater than the first segmentation threshold.

The enhancement principle of the first enhancement coefficient is embodied in that: for a pixel point (classified as an a-type pixel point) in the second image whose pixel value is less than or equal to the second segmentation threshold, the smaller the pixel value of the pixel point is, the greater the enhancement degree for the fourth sub-image is.

The enhancement principle of the second enhancement coefficient is embodied in that: for a pixel point in the first image whose pixel value is greater than the first segmentation threshold and whose position information matches the a-type pixel point, the greater a pixel value of a pixel point in the first sub-image corresponding to the position information of the pixel point is, the greater the enhancement degree for the fourth sub-image is.

It may be understood that, according to Equation (3), the enhancement treatment is not performed on other pixel points in the fourth sub-image other than the above-mentioned pixel points. For each of the other pixel points, the pixel point meets any one or both of the following two conditions:

(1) the pixel point corresponds to a pixel point in the second image whose pixel value is greater than the second segmentation threshold.
(2) the pixel point corresponds to a pixel point in the second image whose pixel value is less than or equal to the second segmentation threshold, and a pixel value of a pixel point in the first image corresponding to a position information of the pixel point is less than or equal to the first segmentation threshold.

In embodiments of the present disclosure, in the enhancement process of the fourth sub-image, pixel point information (including a pixel point position and a pixel value information) of the second image and first image is comprehensively referred to, so that the texture information of the second image is largely retained in the fused image obtained by fusing the fourth sub-image.

In embodiments of the present disclosure, since the fourth sub-image contains the texture information of the second image and the fifth sub-image is obtained by performing the enhancement treatment on the fourth sub-image, the texture information of the second image is largely retained in the fused image obtained by fusing the fifth sub-image.

According to embodiments of the present disclosure, after the first sub-image, the second sub-image, the third sub-image, the fourth sub-image and the fifth sub-image are obtained, a first weight matrix of the first sub-image, a second weight matrix of the second sub-image, a third weight matrix of the third sub-image, a fourth weight matrix of the fourth sub-image and a fifth weight matrix of the fifth sub-image may be determined respectively. In this way, each sub-image may be fused by using each weight matrix to obtain the fused image.

FIG. 5 to FIG. 9 schematically show schematic diagrams of determining weight matrices according to embodiments of the present disclosure.

The determination method of each weight matrix will be described below in combination with FIG. 3, FIG. 4, and FIG. 5 to FIG. 9.

As shown in FIG. 5, the determining the first weight matrix of the first sub-image may include:

A first weight value which matches the pixel point belonging to the first category in the first sub-image are set to be 1. A first weight value which matches a pixel point other than the pixel point belonging to the first category in the first sub-image are set to be 0. Then, the first weight matrix is constructed based on the first weight value. A matrix size of the first weight matrix, for example, corresponds to the image size of the first sub-image. For example, taking the image size of the first sub-image as 3*3, the matrix size of the first weight matrix is also 3*3.

For example, as shown in FIG. 3 and FIG. 5, the pixel points belonging to the first category include $a_{12}$, $a_{21}$, $a_{22}$, and $a_{32}$. As shown in FIG. 5, the first weight matrix is expressed as $W_{pet\_1}$. First weight values corresponding to the pixel points $a_{12}$, $a_{21}$, $a_{22}$ and $a_{32}$ in the first weight matrix $W_{pet\_1}$ are 1, and other first weight values in the first weight matrix $W_{pet\_1}$ are 0.

As shown in FIG. 6, the determining the second weight matrix of the second sub-image may include:

As shown in FIG. 3, the pixel points belonging to the second category in the second sub-image are $a_{11}$, $a_{13}$, $a_{23}$, $a_{31}$ and $a_{33}$. A pixel value of a pixel point in the pixel points $a_{11}$, $a_{13}$, $a_{23}$, $a_{31}$ and $a_{33}$ is expressed as $I_{pet}^{ij}$, and the pixel value $I_{pet}^{ij}$ is equal to a pixel value of a corresponding pixel point in the first image.

For a pixel point belonging to the second category in the second sub-image, a first specific value is determined based on a pixel value $I_{pet}^{ij}$ of the pixel point belonging to the second category in the second sub-image, the first segmentation threshold $T_{Hpet}$, and a second predetermined function (a sine function). For example, the first specific value is expressed as $W_{pet\_2}^{ij}$. A second weight value which matches the pixel point belonging to the second category in the second sub-image is set to be the first specific value $W_{pet\_2}^{ij}$. The first specific value $W_{pet\_2}^{ij}$, for example, is shown in Equation (4).

$$W_{pet\_2}^{ij} = 0.5 \times \left( \sin\left( \frac{I_{pet}^{ij} - 0.5 \times T_{Hpet}}{T_{Hpet}} \pi \right) + 1 \right) \tag{4}$$

A second weight values which matches a pixel point other than the pixel point belonging to the second category in the second sub-image is set to be 0. Then, the second weight matrix is constructed based on the second weight value.

For example, as shown in FIG. 3 and FIG. 6, the pixel points belonging to the second category include $a_{11}$, $a_{13}$, $a_{23}$, $a_{31}$, and $a_{33}$. As shown in FIG. 6, the second weight matrix is expressed as $W_{pet\_2}^{ij}$. Second weight values corresponding to the pixel points $a_{11}$, $a_{13}$, $a_{23}$, $a_{31}$, and $a_{33}$ in the second weight matrix $W_{pet\_2}$ are respectively $W_{pet\_2}^{11}$, $W_{pet\_2}^{13}$, $W_{pet\_2}^{23}$, $W_{pet\_2}^{31}$, $W_{pet\_2}^{33}$, and other second weight values in the second weight matrix $W_{pet\_2}$ are 0. According to Equation (4), each element in the second weight matrix $W_{pet\_2}$ is less than or equal to 1, that is, each element in the second weight matrix $W_{pet\_2}$ is less than or equal to an element in the first weight matrix $W_{pet\_1}$.

In embodiments of the present disclosure, a relatively large first weight matrix is set for the first sub-image, so that the color information in the first sub-image may be included to a large extent during image fusion, thereby retaining the functional information and the metabolic information of the first image to a large extent. A relatively small second weight matrix is set for the second sub-image, so as to weaken the color information of the second sub-image during image fusion, thereby improving an overall contrast of the fused image and highlighting a visual effect.

As shown in FIG. 7, the determining the third weight matrix of the third sub-image includes:

First, matrix addition is performed on the first weight matrix $W_{pet\_1}$ and the second weight matrix $W_{pet\_2}$, so as to obtain a first specific matrix $W_{pet}$.

Then, matrix subtraction is performed on a second specific matrix $W_1$ and the first specific matrix $W_{pet\_2}$, so as to obtain the third weight matrix $W_{mri\_1}$, wherein each element in the second specific matrix $W_1$ is 1.

As shown in FIG. 8, the determining the fourth weight matrix of the fourth sub-image includes:

A third weight value which matches a pixel point belonging to the fourth category in the fourth sub-image is set to be 1. A third weight value which matches a pixel point other than the pixel point belonging to the fourth category in the fourth sub-image may be set to be 0 or 1. In embodiments of the present disclosure, for example, the first weight value which matches the pixel point other than the pixel point belonging to the fourth category in the fourth sub-image is set to be 0. Then, the fourth weight matrix is constructed based on the third weight value. For example, a matrix size of the fourth weight matrix corresponds to the image size of the fourth sub-image. For example, taking the image size of the fourth sub-image as 3*3, the matrix size of the fourth weight matrix is also 3*3.

For example, as shown in FIG. 4 and FIG. 8, the pixel points belonging to the fourth category include $b_{12}$, $b_{21}$, $b_{23}$, and $b_{32}$. As shown in FIG. 8, the fourth weight matrix is expressed as $W_{mri\_2}$. Third weight values corresponding to the pixel points $b_{12}$, $b_{21}$, $b_{23}$ and $b_{32}$ in the fourth weight matrix $W_{mri\_2}$ are 1, and other third weight values in the fourth weight matrix $W_{mri\_2}$ may be 0 or 1. For example, in embodiments of the present disclosure, other third weight values are 0.

As shown in FIG. 9, the determining the fifth weight matrix of the fifth sub-image includes:

First, a luminance value corresponding to a pixel value of each pixel point in the first image is determined, and then a mean value of luminance values of a plurality of pixel points in the first image is determined. The mean value is expressed as, for example, $I_{meanPET}$.

Then, a second specific value $W_{h\_mri}$ is determined according to the mean value. The relationship between the second specific value $W_{h\_mri}$ and the mean value $I_{meanPET}$ is shown in Equation (5).

$$W_{h\_mri} \begin{cases} 4 & \text{if } I_{meanPET} > 0.4 \\ 20 \times I_{meanPET} - 4 & \text{if } I_{meanPET} \in [0.2, 0.4] \\ 0 & \text{if } I_{meanPET} < 0.2 \end{cases} \quad (5)$$

Next, a fourth weight value which matches each pixel point in the fifth sub-image is set to be the second specific value, and the fifth weight matrix $W_{H\_mri}$ is constructed based on the fourth weight value. The fifth weight matrix $W_{H\_mri}$ is, for example, shown as FIG. 9.

In the embodiment of the disclosure, after determining each weight, weighted summation may be performed on pixel values of pixel points for a position in the first sub-image, the second sub-image, the third sub-image, the fourth sub-image, and the fifth sub-image by using weight values for the position in the first weight matrix $W_{pet\_1}$, the second weight matrix $W_{pet\_2}$, the third weight matrix $W_{mri\_1}$, the fourth weight matrix $W_{mri\_2}$ and the fifth weight matrix $W_{H\_mri}$, so as to determine a pixel value for the position in the fused image.

For example, an image size of the fused image obtained by fusing the first sub-image, the second sub-image, the third sub-image, the fourth sub-image and the fifth sub-image is the same as the image size of each sub-image. A pixel value of a pixel point in the i-th row and the j-th column of the fused image is expressed as $I_{fusion}^{ij}$, wherein a calculation process of $I_{fusion}^{ij}$ is shown as Equation (6) or Equation (7).

$$I_{fusion}^{ij} = W_{pet\_1}^{ij} \times I_{pet\_1}^{ij} + W_{pet\_2}^{ij} \times I_{pet\_2}^{ij} + W_{mri\_1}^{ij} \times I_{mri\_1}^{ij} + W_{mri\_2}^{ij} \times I_{mri\_2}^{ij} + W_{H\_mri}^{ij} \times I_{H\_mri}^{ij} \quad (6)$$

$I_{pet\_1}^{ij}$, $I_{pet\_2}^{ij}$, $I_{mri\_1}^{ij}$, $I_{mri\_2}^{ij}$, and $I_{H\_mri}^{ij}$ represents the pixel values of the pixel points in the i-th row and the j-th column of the first sub-image, the second sub-image, the third sub-image, the fourth sub-image, and the fifth sub-image, respectively.

$$I_{fusion}^{ij} = W_{pet}^{ij} \times I_{pet}^{ij} + W_{mri\_1}^{ij} \times I_{mri\_1}^{ij} + W_{mri\_2}^{ij} \times I_{mri\_2}^{ij} + W_{H\_mri}^{ij} \times I_{H\_mri}^{ij} \quad (7)$$

$W_{pet}^{ij}$ represents an element in the i-th row and the j-th column of the first specific matrix $W_{pet}$. The first specific matrix $W_{pet}$ is obtained by matrix addition of the first weight matrix $W_{pet\_1}$ and the second weight matrix $W_{pet\_2}$. The first specific matrix $W_{pet}$ may be used as a weight matrix of the whole first image. $I_{pet}^{ij}$ represents a pixel value of the pixel point of the i-th row and the j-th column in the first image, wherein $W_{pet\_1}^{ij} \times I_{pet\_1}^{ij} + W_{pet\_2}^{ij} \times I_{pet\_2}^{ij} = W_{pet}^{ij} \times I_{pet}^{ij}$.

According to embodiments of the present disclosure, $I_{pet}^{ij}$ in the above-mentioned Equation (7) represents a pixel value of the pixel point in the i-th row and the j-th column of the first image, and $I_{mri\_1}^{ij}$ represents a pixel value of the pixel point in the i-th row and the j-th column of the third sub-image. The meaning of $W_{pet}^{ij} \times I_{pet}^{ij} + W_{mri\_1}^{ij} \times I_{mri\_1}^{ij}$ in the above-mentioned Equation (7), for example, includes:

when the third sub-image is fused with the first image, a better effect is acquired between a color fidelity effect and a detailed texture retention effect. As shown in FIG. 7, since the third weight matrix $W_{mri\_1}$ is obtained by matrix subtraction of the second specific matrix $W_1$ and the first specific matrix $W_{pet}$, it may be seen that for a region (a pixel point corresponding to the region has a larger weight value in the first specific matrix $W_{pet}$) with better color fidelity effect in the first image, the less detailed texture is retained in the third sub-image corresponding to the region (a pixel point corresponding to the region has a smaller weight value in the third weight matrix $W_{mri\_1}$); on the contrary, for a region with worse color fidelity effect in the first image, the more detailed textures are retained in the third sub-image corresponding to the region.

It may be seen from the above-mentioned Equation (7) that $W_{H\_mri}^{ij} \times I_{H\_mri}^{ij}$ enhances a visual effect of the fused image. Specifically, since the fifth weight matrix $W_{H\_mri}$ is obtained according to the luminance value of each pixel point of the first image, when the pixel value $I_{H\_mri}$ of each pixel point in the fifth sub-image is enhanced by the fifth weight matrix $W_{H\_mri}$, the luminance characteristics of the first image are also considered. For example, when the overall luminance value of the first image is relatively large, an element value in the fifth weight matrix is relatively large; when the overall luminance value of the first image is relatively small, the element value in the fifth weight matrix is relatively small. In addition, since the fifth sub-image is obtained by performing the enhancement treatment on the fourth sub-image through the second enhancement coefficient, after performing image fusion through the fifth sub-image, pixel points in the obtained fused image which correspond to the pixel points belonging to the first category in the first sub-image display a relatively clear texture structure under the effect of the second enhancement coefficient.

FIG. 10 to FIG. 45 schematically show schematic diagrams of experimental results according to embodiments of the present disclosure.

In order to illustrate the fusion effect of image fusion by the method of embodiments of the present disclosure, 36 groups of comparative experiments have been conducted in embodiments of the present disclosure. FIG. 10 to FIG. 45 show experimental results of 36 groups of comparative experiments in sequence.

In a figure of FIG. 10 to FIG. 45, images from left to right are: the first image, the second image, a fused image obtained by using Laplace fusion algorithm, a fused image obtained by using discrete wavelet fusion algorithm, a fused image obtained by using nonsubsampled contourlet transform algorithm, a fused image obtained by using adaptive sparse representation algorithm, and a fused image obtained by using the fusion method of embodiments of the present disclosure.

Table 1 shows, for example, evaluation results of fused images obtained by various methods through a plurality of evaluation indexes.

TABLE 1

| Fused image | Standard deviation | Spatial frequency | Average gradient | Mutual information | Cross entropy | Deviation index |
|---|---|---|---|---|---|---|
| Image A | 61.95 | 8.41 | 24.87 | 1.61 | 1.59 | 0.64 |
| Image B | 58.11 | 9.01 | 25.92 | 1.54 | 1.65 | 0.63 |
| Image C | 57.19 | 8.27 | 24.24 | 1.53 | 1.91 | 0.59 |
| Image D | 53.11 | 7.42 | 22.22 | 1.61 | 1.55 | 0.60 |
| Image E | 67.98 | 9.96 | 28.72 | 2.03 | 1.25 | 0.54 |

The image A represents the fused image obtained by using Laplace fusion algorithm, the image B represents the fused image obtained by using discrete wavelet fusion algorithm, the image C represents the fused image obtained by using nonsubsampled contourlet transform algorithm, the image D represents the fused image obtained by using adaptive sparse representation algorithm, and the image E represents the fused image obtained by using the fusion method of embodiments of the present disclosure.

The plurality of evaluation indexes include standard deviation, spatial frequency, average gradient, mutual information, cross entropy, deviation index, etc. The plurality of evaluation indexes may generally be used to evaluate the quality of image fusion.

For evaluation index values corresponding to each fused image in Table 1, the evaluation index values are obtained by averaging evaluation index values corresponding to each of the 36 groups of experimental data. For example, taking a standard deviation corresponding to the image A as an example, 36 standard deviations corresponding to 36 groups of experiments are obtained by calculating the standard deviation of the image A in each of the 36 groups of experiments, and then a mean value of the 36 standard deviations is calculated to obtain a final standard deviation of the image A as 61.95.

The meaning of each evaluation index will be explained as follows.

The standard deviation is a square root of a root mean square error, wherein the root mean square error is a difference between pixel values of each pixel of a source image and pixel values of each pixel of a fused image.

The spatial frequency reflects a change rate of an image gray level, and the spatial frequency may be used to reflect a clarity of an image, wherein the clearer the image is, the higher the spatial frequency is.

The average gradient reflects a clarity of a fused image and may also measure a spatial resolution of the fused image, wherein the larger the average gradient is, the higher the spatial resolution is.

The mutual information is an information measurement, which refers to an internal relationship between two events, wherein the larger the mutual information value is, the more source image information retained in the fused image is, and the better the fusion effect is.

The cross entropy reflects a difference between gray values of pixel points of the source image and gray values of corresponding pixel points of the fused image, wherein the smaller the value of cross entropy is, the smaller the difference is, and the better the fusion effect is.

The deviation index reflects a difference in a spectral information between the source image and the fused image, wherein the closer the value of the deviation index to 0 is, the smaller the difference is, and the closer the source image to the fused image is.

According to the visual effects shown in FIG. 10 to FIG. 45 and the values corresponding to the evaluation indexes in Table 1, the quality of the fused image obtained by the image fusion method of embodiments of the present disclosure is obviously better than the quality of the fused image obtained by other fusion methods.

Figure 46:
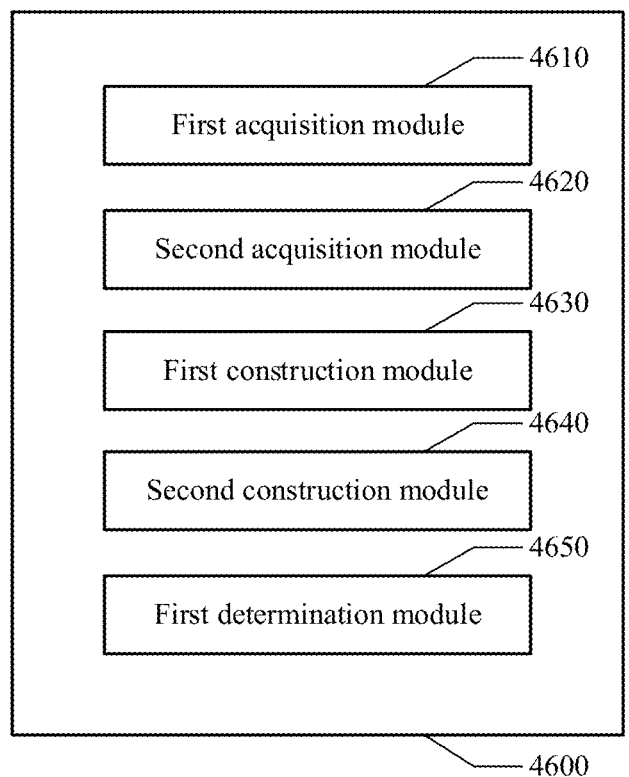
FIG. 46 schematically shows a block diagram of an apparatus of processing an image according to embodiments of the present disclosure.

FIG. 46 schematically shows a block diagram of an apparatus of processing an image according to embodiments of the present disclosure.

As shown in FIG. 46, an apparatus 4600 of processing an image may include a first acquisition module 4610, a second acquisition module 4620, a first construction module 4630, a second construction module 4640, and a first determination module 4650.

The first acquisition module 4610 may be used to acquire a first image for a target object by using a first imaging method. According to embodiments of the present disclosure, the first acquisition module 4610 may, for example, perform the operation S110 described above with reference to FIG. 1, which will not be repeated here.

The second acquisition module 4620 may be used to acquire a second image for the target object by using a second imaging method. According to embodiments of the present disclosure, the second acquisition module 4620 may, for example, perform the operation S120 described above with reference to FIG. 1, which will not be repeated here.

The first construction module 4630 may be used to construct a first sub-image and a second sub-image based on the first image. According to embodiments of the present disclosure, the first construction module 4630 may, for example, perform the operation S130 described above with reference to FIG. 1, which will not be repeated here.

The second construction module 4640 may be used to construct a third sub-image and a fourth sub-image based on the second image. According to embodiments of the present disclosure, the second construction module 4640 may, for example, perform the operation S140 described above with reference to FIG. 1, which will not be repeated here.

The first determination module 4650 may be used to determine a pixel value distribution information of a fused image based on a pixel value distribution information of each of the first sub-image, the second sub-image, the third sub-image, and the fourth sub-image, so as to obtain the fused image. According to embodiments of the present disclosure, the first determination module 4650 may, for example, perform the operation S150 described above with reference to FIG. 1, which will not be repeated here.

Any number of modules, sub-modules, units, sub-units, or at least part of the function of any number thereof according to embodiments of the present disclosure may be implemented in one module. Any one or more of the modules, sub-modules, units, and sub-units according to embodiments of the present disclosure may be divided into a plurality of modules for implementation. Any one or more of the modules, sub-modules, units, sub-units according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware, and firmware. Alternatively, one or more of the modules, sub-modules, units, and sub-units according to embodiments of the present disclosure may be implemented at least partially as a computer program module, which when executed, may perform a corresponding function.

For example, any number of the first acquisition module 4610, the second acquisition module 4620, the first construction module 4630, the second construction module 4640, and the first determination module 4650 may be combined into one module to be implemented or any one of the modules may be divided into a plurality of modules. Alternatively, at least part of the function of one or more of these modules may be combined with at least part of the function of other modules and implemented in one module. According to embodiments of the present disclosure, at least one of the first acquisition module 4610, the second acquisition module 4620, the first construction module 4630, the second construction module 4640, and the first determination module 4650 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the first acquisition module 4610, the second acquisition module 4620, the first construction module 4630, the second construction module 4640, and the first determination module 4650 may be implemented at least partially as a computer program module, which when executed, may perform a corresponding function.

Figure 47:
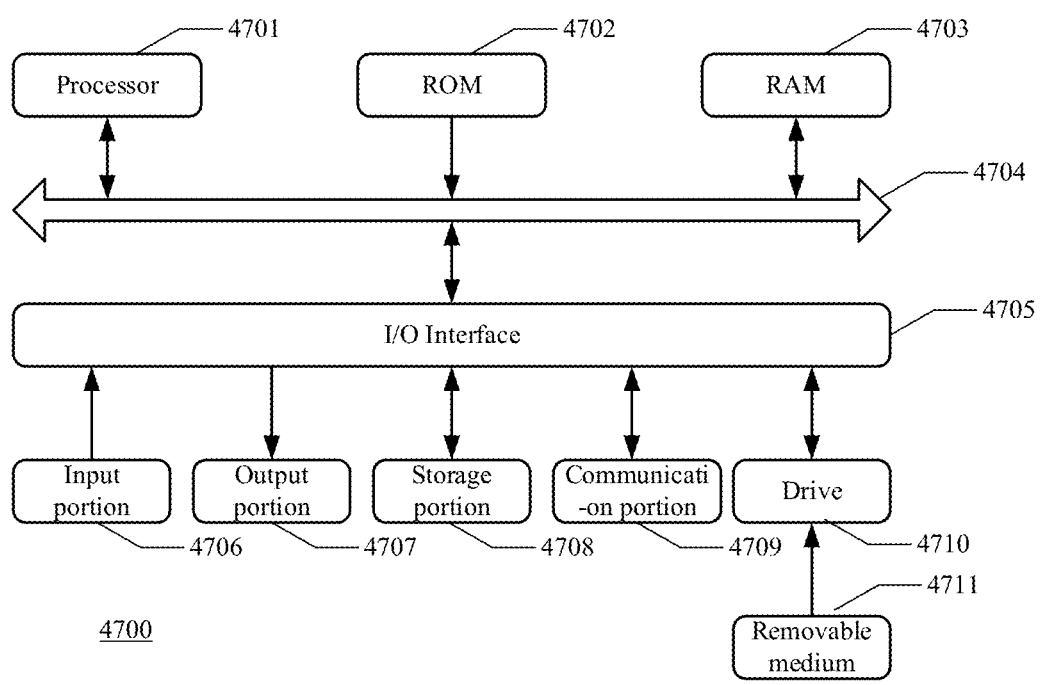
FIG. 47 schematically shows a block diagram of a computer system suitable for image processing according to embodiments of the present disclosure.

FIG. 47 schematically shows a block diagram of a computer system suitable for image processing according to embodiments of the present disclosure. The computer system shown in FIG. 47 is only an example, and should not be construed as imposing any limitation on the function and scope of use of embodiments of the present disclosure.

As shown in FIG. 47, a computer system 4700 according to embodiments of the present disclosure includes a processor 4701 that may perform various appropriate actions and processes according to programs stored in a read-only memory (ROM) 4702 or programs loaded from a storage portion 4708 into a random access memory (RAM) 4703. The processor 4701 may include, for example, a general-purpose microprocessor (e.g., a CPU), an instruction set processor and/or a related chipset and/or a special-purpose microprocessor (e.g., an application-specific integrated circuit (ASIC)), etc. The processor 4701 may also include an on-board memory for caching purposes. The processor 4701 may include a single processing unit or a plurality of processing units for performing different actions of a method flow according to embodiments of the present disclosure.

In the RAM 4703, various programs and data required for the operation of the system 4700 are stored. The processor 4701, the ROM 4702 and the RAM 4703 are connected to each other through a bus 4704. The processor 4701 performs various operations of the method flow according to embodiments of the present disclosure by executing the programs in the ROM 4702 and/or the RAM 4703. It should be noted that the programs may also be stored in one or more memories other than the ROM 4702 and the RAM 4703. The processor 4701 may also perform various operations of the method flow according to embodiments of the present disclosure by executing the programs stored in the one or more memories.

According to embodiments of the present disclosure, the system 4700 may also include an input/output (I/O) interface 4705, and the input/output (I/O) interface 4705 is also connected to the bus 4704. The system 4700 may also include one or more of the following components connected to the I/O interface 4705: an input portion 4706 including a keyboard, a mouse, etc.; an output portion 4707 including a cathode ray tube (CRT), a liquid crystal display (LCD), etc., and a speaker, etc.; a storage portion 4708 including a hard disk, etc.; and a communication portion 4709 including a network interface card such as a LAN card, a modem, etc. The communication portion 4709 performs communication processing via a network such as the Internet. A drive 4710 is also connected to the I/O interface 4705 as required. A removable medium 4711, such as a magnetic disk, an optical disk, a magneto-optical disk, a semiconductor memory, etc., is mounted on the drive 4710 as required so that a computer program read therefrom is installed into the storage portion 4708 as required.

According to embodiments of the present disclosure, the method flow according to embodiments of the present disclosure may be implemented as a computer software program. For example, embodiments of the present disclosure include a computer program product including a computer program carried on a computer-readable storage medium, and the computer program contains program code for performing the method illustrated in the flowchart. In such an embodiment, the computer program may be downloaded from the network via the communication portion 4709 and installed, and/or installed from the removable medium 4711. The computer program, when executed by the processor 4701, performs the functions described above defined in the system of embodiments of the present disclosure. According to embodiments of the present disclosure, the system, device, apparatus, module, unit, etc. described above may be implemented by the computer program module.

The present disclosure further provides a computer-readable storage medium. The computer-readable storage medium may be included in the device/apparatus/system described in the above-mentioned embodiments, and may also exist alone without being assembled into the device/apparatus/system. The computer-readable storage medium described above carries one or more programs, and when the one or more programs are executed, the method according to embodiments of the present disclosure may be implemented.

According to embodiments of the present disclosure, the computer-readable storage medium may be a computer nonvolatile computer-readable storage medium. For example, the computer-readable storage medium may include but not limited to: a portable computer disk, a hard disk, a random access memory (RAM), a read only memory (ROM), an erasable programmable read only memory (EPROM or flash memory), a portable compact disk read only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus, or device.

For example, according to embodiments of the present disclosure, the computer-readable storage medium may include the ROM 4702 and/or the RAM described above, and/or one or more memories other than the ROM 4702 and the RAM 4703.

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, a program segment, or a portion of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, which depends upon the functionality involved. It should also be noted that each block of the block diagrams or flowcharts, and combinations of the blocks in the block diagrams or flowcharts, may be implemented by using a special purpose hardware-based system that performs the specified functions or operations, or may be implemented using a combination of a special purpose hardware and computer instructions.

Those skilled in the art may be understood that features recited in the various embodiments and/or the claims of the present disclosure may be combined and/or incorporated in a variety of ways, even if such combinations or incorporations are not clearly recited in the present disclosure. In particular, the features recited in the various embodiments and/or the claims of the present disclosure may be combined and/or incorporated without departing from the spirit and teachings of the present disclosure, and all such combinations and/or incorporations fall within the scope of the present disclosure.

Embodiments of the present disclosure have been described above. However, these examples are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of processing an image, comprising:
   acquiring a first image for a target object by using a first imaging method;
   acquiring a second image for the target object by using a second imaging method;
   constructing a first sub-image and a second sub-image based on the first image;
   constructing a third sub-image and a fourth sub-image based on the second image; and
   determining a pixel value distribution information of a fused image based on a pixel value distribution information of each of the first sub-image, the second sub-image, the third sub-image, the fourth sub-image, and a fifth sub-image so as to obtain the fused image,
   wherein the fifth sub-image is obtained by:
   determining a second segmentation threshold based on a pixel value distribution information of the second image;
   for a pixel point in a plurality of pixel points of the fourth sub-image:
   determining a first enhancement coefficient based on a pixel value of a pixel point in the second image, the second segmentation threshold, and a first predetermined function, wherein the pixel point in the second image matches a position information of the pixel point in the plurality of pixel points of the fourth sub-image;
   acquiring a pixel value of a pixel point in the first image as a second enhancement coefficient, wherein the pixel point in the first image matches the position information of the pixel point in the plurality of pixel points of the fourth sub-image;
   determining an enhancement pixel value of the pixel point in the plurality of pixel points of the fourth sub-image based on a pixel value of the pixel point in the plurality of pixel points of the fourth sub-image, the first enhancement coefficient, and the second enhancement coefficient; and constructing the fifth sub-image based on the enhancement pixel value of each of the plurality of pixel points of the fourth sub-image.

2. The method according to claim 1, wherein constructing the first sub-image and the second sub-image based on the first image comprises:
   determining a first segmentation threshold based on a pixel value distribution information of the first image;
   determining, based on the first segmentation threshold, a category that each pixel point in the first image belongs to, wherein the category comprises a first category and a second category;
   constructing the first sub-image according to a pixel point belonging to the first category in the first image; and
   constructing the second sub-image according to a pixel point belonging to the second category in the first image.

3. The method according to claim 2, wherein the determining, based on the first segmentation threshold, a category that each pixel point in the first image belongs to comprises:
   for each pixel point in the first image, determining whether a pixel value of the pixel point is greater than the first segmentation threshold;
   determining that the pixel point belongs to the first category when the pixel value of the pixel point is greater than the first segmentation threshold; and
   determining that the pixel point belongs to the second category when the pixel value of the pixel point is not greater than the first segmentation threshold.

4. The method according to claim 2, wherein the determining the first segmentation threshold based on the pixel value distribution information of the first image comprises:
   determining a first coefficient;
   calculating, based on the pixel value distribution information of the first image, a first threshold by using a maximum between-class variance algorithm; and determining the first segmentation threshold based on the first coefficient and the first threshold.

5. The method according to claim 1, wherein the constructing a third sub-image and a fourth sub-image based on the second image comprises:
    performing a filtering treatment on the pixel value distribution information of the second image, so as to determine a pixel value change rate of each pixel point relative to an adjacent pixel point in the second image;
    for each pixel point in the second image, determining whether a pixel value change rate of the pixel point is less than a preset change rate;
    determining that the pixel point belongs to a third category when the pixel value change rate of the pixel point is less than the preset change rate;
    determining the pixel point belongs to a fourth category when the pixel value change rate of the pixel point is not less than the preset change rate;
    constructing the third sub-image according to the pixel point belonging to the third category in the second image; and
    constructing the fourth sub-image according to the pixel point belonging to the fourth category in the second image.

6. The method according to claim 5, wherein the performing the filtering treatment on the pixel value distribution information of the second image comprises:
    performing the filtering treatment on the pixel value distribution information of the second image by using a weighted least squares filter.

7. The method according to claim 1, wherein the first predetermined function comprises a monotone decreasing function.

8. The method according to claim 1, wherein the determining a second segmentation threshold based on the pixel value distribution information of the second image comprises:
    determining a second coefficient;
    calculating, based on the pixel value distribution information of the second image, a second threshold by using a maximum between-class variance algorithm; and
    determining the second segmentation threshold based on the second coefficient and the second threshold.

9. The method according to claim 1, further comprising:
    respectively determining a first weight matrix of the first sub-image, a second weight matrix of the second sub-image, a third weight matrix of the third sub-image, a fourth weight matrix of the fourth sub-image, and a fifth weight matrix of the fifth sub-image;
    wherein the determining the pixel value distribution information of a fused image comprises: performing weighted summation on pixel values of pixel points for a position in the first sub-image, the second sub-image, the third sub-image, the fourth sub-image, and the fifth sub-image by using weight values for the position in the first weight matrix, the second weight matrix, the third weight matrix, the fourth weight matrix and the fifth weight matrix, so as to determine a pixel value for the position in the fused image.

10. The method according to claim 9, wherein the determining the first weight matrix of the first sub-image comprises:
    setting a first weight value which matches the pixel point belonging to the first category in the first sub-image to be 1;
    setting a first weight value which matches a pixel point other than the pixel point belonging to the first category in the first sub-image to be 0; and
    constructing the first weight matrix based on either the first weight value which matches the pixel point belonging to the first category or the first weight value which matches a pixel point other than the pixel point belonging to the first category in the first sub-image.

11. The method according to claim 9, wherein the determining the second weight matrix of the second sub-image comprises:
    for a pixel point belonging to the second category in the second sub-image, determining a first specific value based on a pixel value of the pixel point belonging to the second category in the second sub-image, the first segmentation threshold, and a second predetermined function; setting a second weight value which matches the pixel point belonging to the second category in the second sub-image to be the first specific value;
    setting a second weight value which matches a pixel point other than the pixel point belonging to the second category in the second sub-image to be 0; and
    constructing the second weight matrix based on the second weight value.

12. The method according to claim 9, wherein the determining the third weight matrix of the third sub-image comprises:
    performing matrix addition on the first weight matrix and the second weight matrix, so as to obtain a first specific matrix; and
    performing matrix subtraction on a second specific matrix and the first specific matrix, so as to obtain the third weight matrix, wherein each element in the second specific matrix is 1.

13. The method according to claim 9, wherein the determining the fourth weight matrix of the fourth sub-image comprises:
    setting a third weight value which matches a pixel point belonging to the fourth category in the fourth sub-image to be 1; and
    constructing the fourth weight matrix based on the third weight value.

14. The method according to claim 9, wherein the determining the fifth weight matrix of the fifth sub-image comprises:
    determining a luminance value corresponding to a pixel value of each pixel point in the first image;
    determining a mean value of luminance values of a plurality of pixel points in the first image;
    determining a second specific value according to the mean value;
    setting a fourth weight value which matches each pixel point in the fifth sub-image to be the second specific value; and
    constructing the fifth weight matrix based on the fourth weight value.

15. The method according to claim 1, wherein the first imaging method comprises positron emission computed tomography or single-photon emission computed tomography, and the second imaging method comprises magnetic resonance imaging.

16. A computing device, comprising:
    one or more processors; and
    a storage apparatus for storing one or more programs,
    wherein the one or more programs, when executed by the one or more processors, cause the one or more processors to implement the method according to claim 1.

17. A computer-readable storage medium having executable instructions stored thereon, wherein the instructions, when executed by a processor, cause the processor to implement the method according to claim 1.

* * * * *